United States Patent
Qiu et al.

(10) Patent No.: US 11,222,521 B2
(45) Date of Patent: Jan. 11, 2022

(54) DELIVERY SYSTEM AND DELIVERY SERVER

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/987,369

(22) Filed: Aug. 6, 2020

(65) Prior Publication Data

US 2020/0365007 A1 Nov. 19, 2020

Related U.S. Application Data

(63) Continuation of application No. 16/165,614, filed on Oct. 19, 2018, now Pat. No. 10,769,929.

(30) Foreign Application Priority Data

Oct. 20, 2017 (JP) .............................. JP2017-203748

(51) Int. Cl.
| | |
|---|---|
| *G08B 21/24* | (2006.01) |
| *G06Q 10/08* | (2012.01) |
| *B60P 3/20* | (2006.01) |
| *G08B 21/18* | (2006.01) |

(52) U.S. Cl.
CPC ................ *G08B 21/24* (2013.01); *B60P 3/20* (2013.01); *G06Q 10/0832* (2013.01); *G08B 21/182* (2013.01)

(58) Field of Classification Search
CPC ..... B60P 3/20; G06Q 10/0832; G08B 21/182; G08B 21/24
See application file for complete search history.

(56) References Cited

U.S. PATENT DOCUMENTS

| | | |
|---|---|---|
| 9,911,290 B1 | 3/2018 | Penilla et al. |
| 2002/0000092 A1 | 1/2002 | Carr et al. |
| 2002/0078701 A1 | 6/2002 | Doi et al. |
| 2018/0120169 A1 | 5/2018 | Cimelli et al. |
| 2018/0341891 A1 | 11/2018 | Haley et al. |
| 2019/0088105 A1* | 3/2019 | Lawson ................. G08B 21/24 |
| 2019/0122527 A1 | 4/2019 | Qiu et al. |

FOREIGN PATENT DOCUMENTS

| | | |
|---|---|---|
| CN | 105607559 A | 5/2016 |
| JP | 2001-147075 A | 5/2001 |
| JP | 2017040466 A | 2/2017 |

* cited by examiner

*Primary Examiner* — Nader Bolourchi
(74) *Attorney, Agent, or Firm* — Hunton Andrews Kurth LLP

(57) ABSTRACT

A delivery system for delivering a delivery item to a vehicle includes a vehicle equipped with a cooling box which is provided with an openable door and configured to accommodate a delivery item, at least one deliverer terminal provided with a notification device for sending a notification to a deliverer, and a delivery server configured to communicate with the vehicle and the deliverer terminal. The delivery server sends to the deliverer terminal a notification indicating that the door is unclosed if the deliverer forgets to close the door.

9 Claims, 10 Drawing Sheets

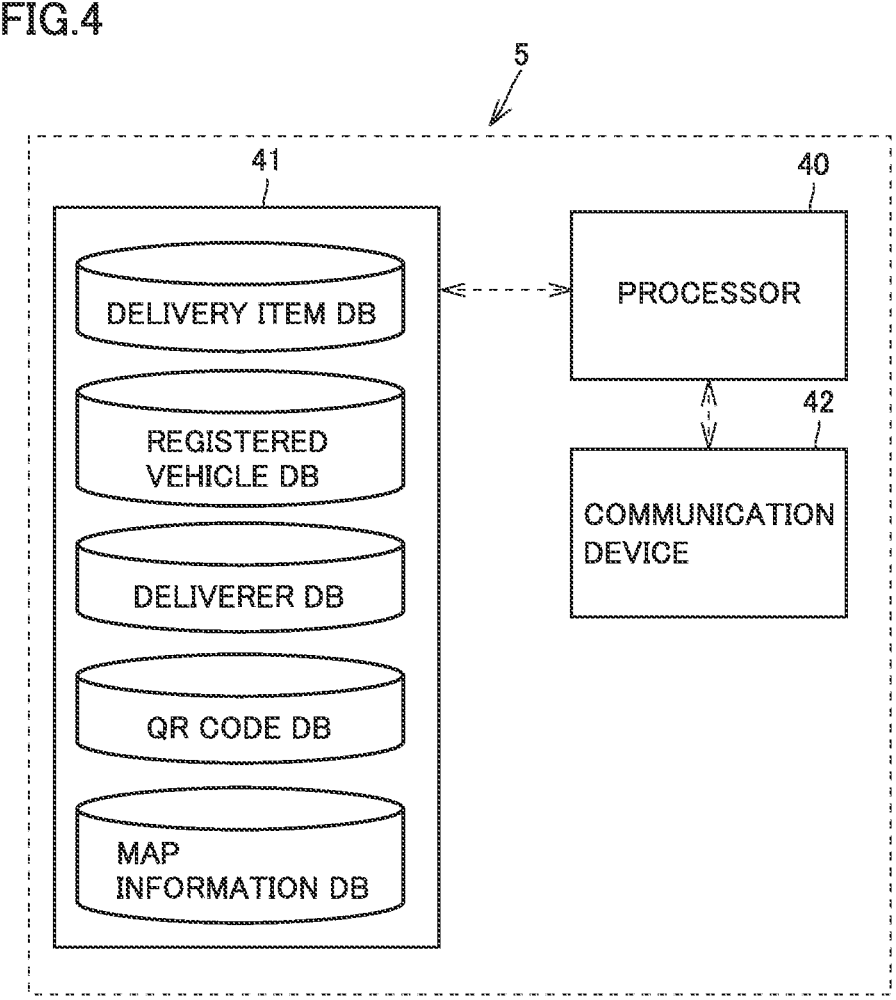

FIG.5

DELIVERY ITEM DB

| DELIVERY ITEM ID | *** | *** |
|---|---|---|
| DELIVERY ITEM | LETTUCE CARROT | ORANGE APPLE |
| SENDER | COMPANY A | COMPANY B |
| SENDER'S ADDRESS | ST. A, CITY B | ST. B, CITY C |
| SENDING DATE | *(MONTH) *(DAY), 2017 | *(MONTH) *(DAY), 2017 |
| PACKAGE RECIPIENT | MR. YAMADA | MR. SUZUKI |
| E-MAIL ADDRESS OF PACKAGE RECIPIENT | *@ | *@ |
| DESTINATION | REGISTERED VEHICLE ID | HOME |
| DESTINATION CONTACT INFORMATION | COMMUNICATION ID OF REGISTERED VEHICLE | ST. C, CITY D |
| SCHEDULED DELIVERY DATE AND TIME | *(MONTH) *(DAY), 2017, : (TIME) | *(MONTH) *(DAY), 2017, : (TIME) |
| DELIVERER TERMINAL ID | C0011 | C0012 |
| DELIVERY VEHICLE ID | ****** | ****** |
| POSITION INFORMATION OF DELIVERY VEHICLE | ***** | ***** |
| QR CODE | | |

FIG.6

REGISTERED VEHICLE DB

| VEHICLE ID | *** | *** |
|---|---|---|
| VEHICLE NUMBER | *** − *** | *** − *** |
| REGISTRANT | MR. YAMADA | MR. YAMASHITA |
| COMMUNICATION ID | ***** | ***** |
| REGISTRANT CONTACT INFORMATION | 090 − **** − *** | 090 − **** − *** |
| VEHICLE COLOR/TYPE | RED SUV | BLACK SEDAN |

FIG.7

DELIVERER DB

| DELIVERER ID | C0011 | C0012 |
|---|---|---|
| DELIVERER MOBILE PHONE NUMBER | 090 − **** − **** | 090 − **** − **** |
| POSITION INFORMATION | LATITUDE XXX, LONGITUDE YYY | LATITUDE YYY, LONGITUDE ZZZ |
| DELIVERER NAME | *** | *** |

FIG.8

QR CODE DB

| DELIVERY SERVER ADDRESS |
|---|
| DELIVERY ITEM ID |
| PACKAGE RECIPIENT |
| DESTINATION |
| DELIVERY VEHICLE ID |

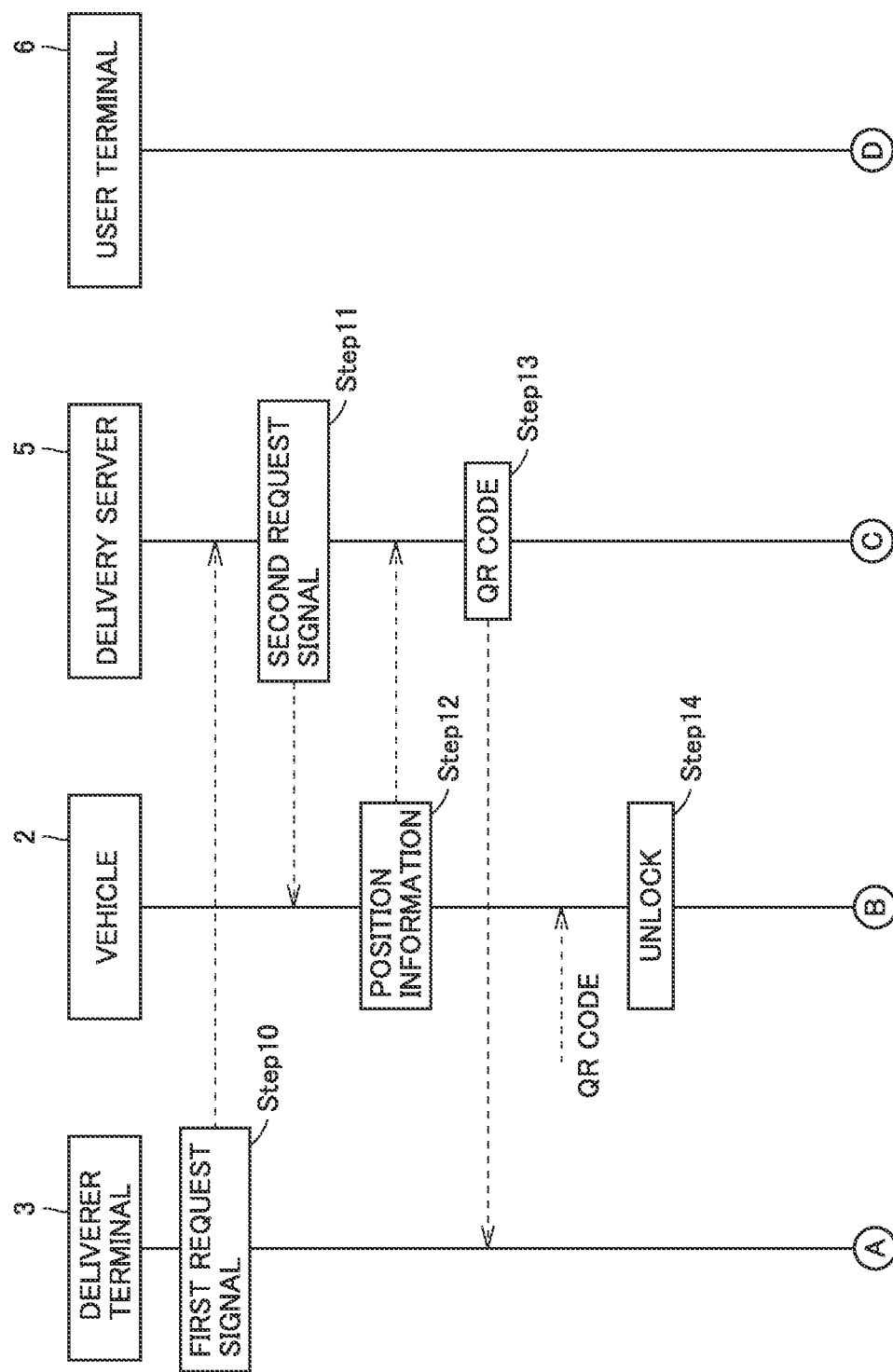

DELIVERY SYSTEM AND DELIVERY SERVER

This is a continuation application of U.S. patent application Ser. No. 16/165,614, filed Oct. 19, 2018, which is based on Japanese Patent Application No. 2017-203748 filed on Oct. 20, 2017 with the Japan Patent Office, the entire contents of which are hereby incorporated by reference.

BACKGROUND

Field

The present disclosure relates to a delivery system and a delivery server.

Description of the Background Art

Japanese Patent Laying-open No. 2001-147075 describes a refrigerating system including a refrigerator and a remote controller disposed at a position distant from the refrigerator.

In the refrigeration system described above, the refrigerator sends information such as the internal temperature of the refrigerator to the remote controller. Thus, the user may know the internal temperature from a location distant from the refrigerator, and may change the preset temperature inside the refrigerator as well.

SUMMARY

The inventors of the present application have been assiduously studying a system for delivering a delivery item to a vehicle, specifically, a delivery system including a vehicle equipped with a refrigerator capable of accommodating a delivery item, a deliverer terminal provided with a notification device for sending a notification to a deliverer who is responsible for delivering the delivery item, and a delivery server configured to communicate with the vehicle and the deliverer terminal.

In the delivery system described above, the user may designate a vehicle as a destination, the deliverer may deliver the delivery item to the designated vehicle, and thereafter, the deliverer may place the delivery item in a refrigerator mounted on the vehicle.

However, in the delivery system described above, it is presumable that the deliverer may forget to close the door of the refrigerator. If the deliverer forgets to close the door, usually the refrigerator stops the cooling operation after a predetermined time. Even if the cooling operation is continued while the door is left open, it is impossible to cool the item accommodated therein, which waste energy in vain. As a result, the internal temperature may rise to room temperature.

Depending on the delivery items placed in the refrigerator, it is necessary to preserve them refrigerated or frozen. If the internal temperature of the refrigerator rises, the delivery items may become spoilt.

The present disclosure has been made in view of the aforementioned problems, and an object thereof is to provide a delivery system including a vehicle equipped with a cooling box capable of accommodating a delivery item, a deliverer terminal provided with a notification device for sending a notification to a deliverer who is responsible for delivering the delivery item, and a delivery server configured to communicate with the vehicle and the deliverer terminal, which makes it possible to prevent the delivery item from becoming spoilt even if the deliverer forgets to close the door of the cooling box.

The delivery system according to the present disclosure is configured to deliver a delivery item to a vehicle, and includes a vehicle equipped with a cooling box which is provided with an openable door and configured to accommodate a delivery item, at least one deliverer terminal provided with a notification device for sending a notification to a deliverer, and a delivery server configured to communicate with the vehicle and the deliverer terminal. The delivery server sends to the deliverer terminal a notification indicating that the door is unclosed if the deliverer forgets to close the door.

According to the delivery system described above, even if the deliverer forgets to close the door of the cooling box, it is possible to notify the deliverer that the door is unclosed so as to urge the deliverer to close the door.

The delivery system further includes a user terminal which is carried by a user and configured to communicate with the delivery server. The delivery server sends contact information of the deliverer to the user terminal after sending the notification indicating that the door is unclosed to the deliverer terminal but not receiving a response to the notification indicating that the door is unclosed from the deliverer terminal.

According to the delivery system described above, the user may contact the deliverer and ask the deliverer to close the door.

The cooling box is provided with a temperature sensor for measuring an internal temperature. The delivery system further includes a user terminal which is carried by a user and configured to communicate with the delivery server. The delivery server sends to at least one of the deliverer terminal and the user terminal a notification indicating that the internal temperature of the cooling box is abnormal when the internal temperature becomes equal to or higher than a predetermined temperature. Thus, the user may know the information on the internal temperature.

A delivery server according to the present disclosure is configured to communicate with a vehicle and at least one deliverer terminal. The vehicle is equipped with a cooling box which is provided with an openable door and configured to accommodate a delivery item. The deliverer terminal is provided with a notification device for sending a notification to a deliverer who is responsible for delivering the delivery item. The delivery server sends to the deliverer terminal a notification indicating that the door is unclosed if the deliverer forgets to close the door.

The delivery server is configured to communicate with the user terminal which is carried by a user. After sending the notification indicating that the door is unclosed to the deliverer terminal but not receiving a response to the notification indicating that the door is unclosed from the deliverer terminal, the delivery server sends contact information of the deliverer to the user terminal.

The cooling box is provided with a temperature sensor for measuring an internal temperature, the delivery server is configured to communicate with a user terminal which is carried by a user, and the delivery server sends to at least one of the deliverer terminal and the user terminal a notification indicating that the internal temperature of the cooling box is abnormal when the internal temperature becomes equal to or higher than a predetermined temperature.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a block diagram illustrating the configuration of a delivery server 5;

FIG. 5 is a diagram schematically illustrating a delivery item database;

FIG. 6 is a diagram schematically illustrating a registered vehicle database;

FIG. 7 is a diagram schematically illustrating a deliverer database;

FIG. 8 is a diagram schematically illustrating a QR code database;

FIG. 9 is a state diagram illustrating a state where a deliverer 9A delivers a delivery item W;

DESCRIPTION OF THE PREFERRED EMBODIMENTS

Figure 1:
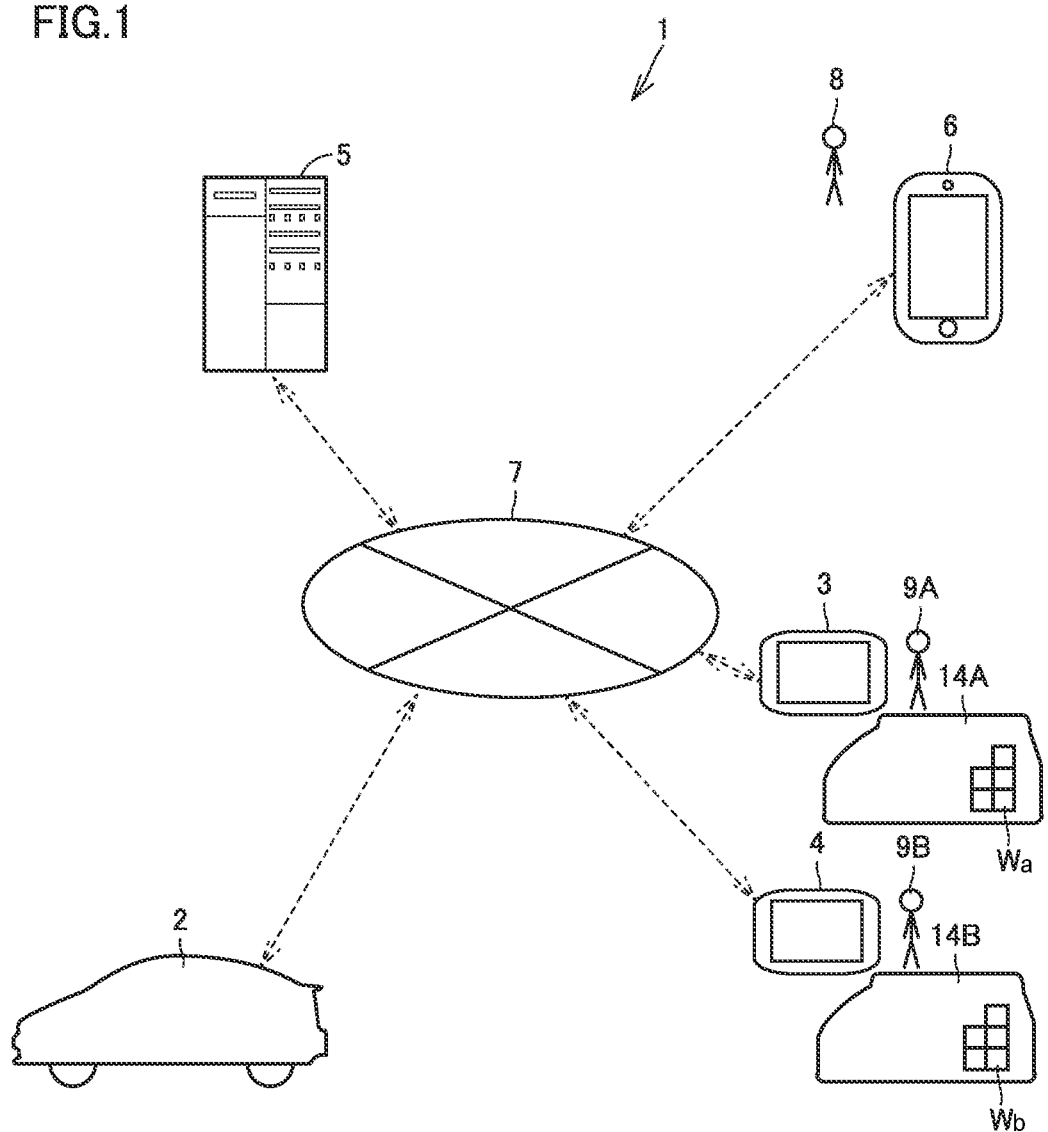
FIG. 1 is a block diagram illustrating a delivery system according to an embodiment of the present disclosure.

A delivery system 1 according to an embodiment of the present disclosure will be described with reference to FIGS. 1 to 14. In the configurations illustrated in FIGS. 1 to 14, the same or substantially the same components are designated by the same reference numerals, and the description thereof will not be repeated.

First Embodiment

FIG. 1 is a block diagram illustrating a delivery system according to a first embodiment. The delivery system 1 includes a vehicle 2, deliverer terminals 3 and 4, a delivery server 5, a user terminal 6, and the Internet 7.

The vehicle 2, the deliverer terminals 3 and 4, the delivery server 5, and the user terminal 6 are configured to communicate with each other via the Internet 7.

The user terminal 6 is a terminal device which is carried by a user 8 who is client of the delivery system 1. The user terminal 6 may be, for example, a smart phone, a mobile phone or the like.

The vehicle 2 is designated by the user 8 as a destination for delivering a delivery item. Typically the vehicle 2 is owned by the user 8, although it is not necessarily to be owned by the user 8.

Figure 2:
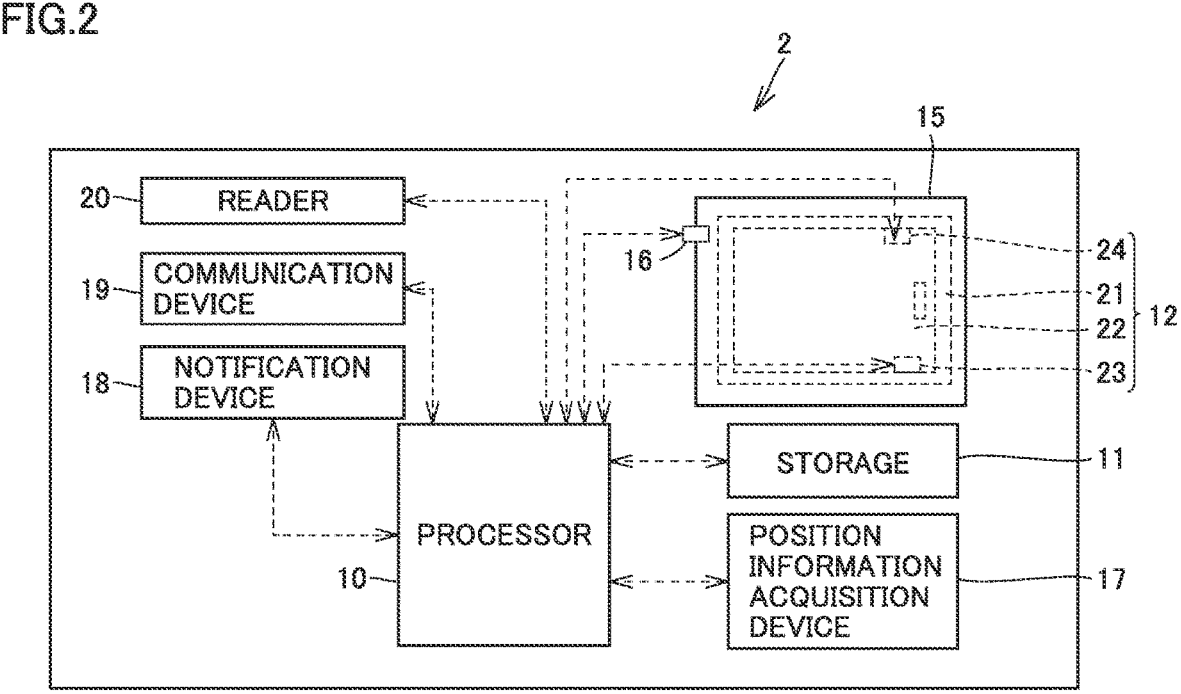
FIG. 2 is a block diagram illustrating the configuration of a vehicle 2.

FIG. 2 is a block diagram illustrating a configuration of the vehicle 2. The vehicle 2 includes a processor 10, a storage 11, a cooling box 12, a vehicle door 15, a locking device 16, a position information acquisition device 17, a notification device 18, a communication device 19, and a reader 20.

The processor 10 is configured to perform arithmetic processing or the like using the obtained various information, and is provided with a CPU or the like. The storage 11 is configured to store various kinds of information obtained from the outside, predetermined information or the like.

The cooling box 12 includes a main body 21, a door 22, a temperature sensor 23, a door sensor 24, and a cooling circuit (not shown).

In the present embodiment, the cooling box may function at least as a refrigerator or a freezer.

The main body 21 of the cooling box is formed with an accommodation compartment for accommodating a delivery item. Cold air from a cooling circuit is supplied into the accommodation compartment. The temperature in the accommodation compartment is adjusted by adjusting the amount of cool air to be supplied into the accommodation compartment. An opening is formed in the main body 21, and the door 22 is provided so as to open and close the opening of the main body 21.

The temperature sensor 23 measures the temperature in the accommodation compartment and sends the measurement result to the processor 10. The door sensor 24 detects whether the door 22 is open or closed, and the door sensor 24 sends the detection result to the processor 10.

The vehicle door 15 is provided on the outside of the vehicle. For example, the deliverer may open the vehicle door 15 so as to access the cooling box 12 mounted on the vehicle 2.

The locking device 16 is configured to lock the vehicle door 15. The locking device 16 locks or unlocks the vehicle door 15 based on a signal sent from the processor 10.

For example, when the vehicle door 15 is closed by a deliverer or the like, the locking device 16 locks the vehicle door 15 automatically.

The position information acquisition device 17 is configured to obtain position information of the vehicle 2. As a method of obtaining the position information of the vehicle 2, the method of obtaining position information from WiFi (Registered Trademark), the method of obtaining position information via GPS (Global Positioning System) or the like may be adopted. The position information acquisition device 17 sends the obtained position information to the processor 10.

The notification device 18 is configured to notify a person in the vicinity of the vehicle 2 of various information. As the notification device 18, an audio device, a liquid crystal screen or the like may be adopted. A person in the vicinity of the vehicle 2 may be, for example, a deliverer, a user, a vehicle owner or the like. The notification device 18 obtains notification information from the processor 10.

The communication device 19 is configured to exchange information with an external communication device. For example, the communication device 19 is configured to communicate with the delivery server 5 or the like via the Internet 7.

The reader 20 is configured to obtain information from the deliverer terminal 3 close to the reader 20. Although in the present embodiment, the reader is a QR code (registered trademark) reader, it may be a bar code reader, or any reader using short-range communication such as Bluetooth (registered trademark). The reader 20 sends the obtained information to the processor 10.

Figure 3:
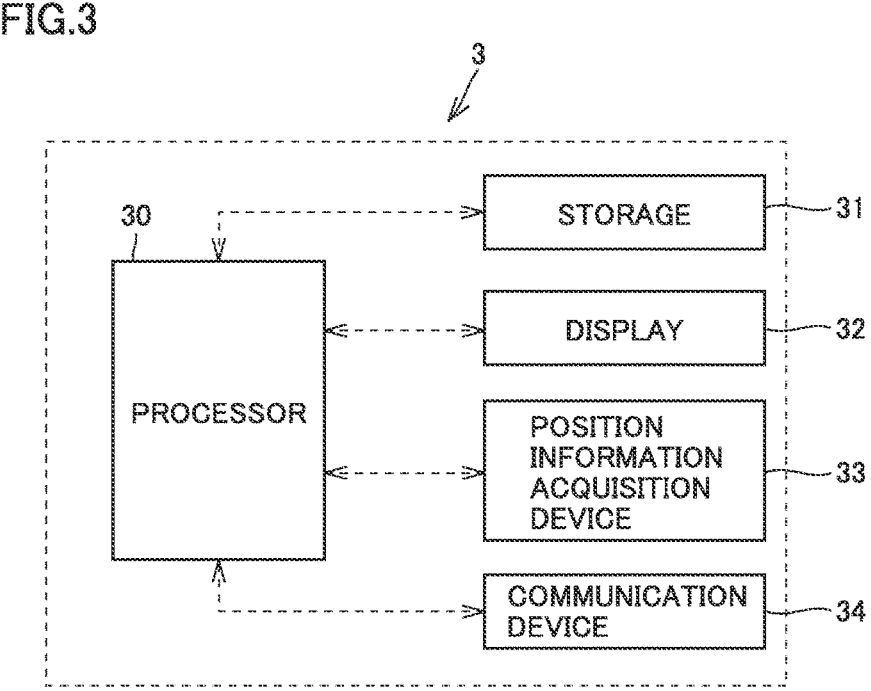
FIG. 3 is a block diagram illustrating the configuration of a deliverer terminal 3.

FIG. 3 is a block diagram illustrating the configuration of the deliverer terminal 3. The deliverer terminal 3 is configured to send notifications about various information to the deliverer 9 who is responsible for delivering a delivery item and send information to the reader 20 of the vehicle 2.

The deliverer terminal 3 includes a processor 30, a storage 31, a display 32, a position information acquisition device 33, and a communication device 34.

The processor 30 is configured to process and compute various kinds of obtained information. The storage 31 stores obtained information and predetermined information.

The display 32 is typically a touch panel screen, for example, a liquid crystal display or the like. The display 32 displays various information received from the processor 30. In the present embodiment, a QR code or the like to be described hereinafter may be displayed on the display 32.

The position information acquisition device 33 is configured to obtain the position information of the deliverer terminal 3. The communication device 34 is configured to communicate with the delivery server 5 and the like via the Internet 7.

The position information acquisition device 33 sends the position information to the delivery server 5 together with a deliverer terminal ID regularly or intermittently. Thereby, the delivery server 5 obtains the position information of each of the deliverer terminals 3 and 4.

As illustrated in FIG. 1, a deliverer 9A is carrying the deliverer terminal 3 and a cellular phone. It should be noted that the deliverer terminal 3 may be provided with a call function. The deliverer 9A loads a plurality of delivery items W on a delivery truck 14A and delivers the delivery items W to a plurality of designated destinations. Similarly, a deliverer 9B is carrying the deliverer terminal 4. The deliverer 9B loads a plurality of delivery items W on a delivery truck 14 B and delivers the delivery items W to a plurality of designated destinations. The configuration of the deliverer terminal 4 is substantially the same as that of the deliverer terminal 3.

FIG. 4 is a block diagram illustrating the configuration of the delivery server 5. The delivery server 5 includes a processor 40, a storage 41, and a communication device 42.

The processor 40 is configured to process and compute various kinds of obtained information. Storage 41 is configured to store various kinds of information.

The information stored in the storage 41 includes, for example, a delivery item database, a registered vehicle database, a QR code database, a deliverer database, and a map information database.

FIG. 5 is a diagram schematically illustrating a delivery item database. In the example illustrated in FIG. 5, the delivery item database includes the delivery item ID, the delivery item, the sender, the sender's address, the package recipient, the e-mail address of the package recipient, the destination, the destination contact information and the like.

If a vehicle is designated as the destination, a registered vehicle ID is stored in the destination. Details of the registered vehicle ID will be described hereinafter.

When the registered vehicle ID is stored as the destination, the destination contact information includes a communication ID of the vehicle 2 (the communication ID of the registered vehicle) identified by the registered vehicle ID. When a home is designated as the destination, the destination contact information includes the home address.

The delivery server 5 may use the communication ID to communicate with the vehicle 2 identified by the registered vehicle ID via the Internet 7.

FIG. 6 is a diagram schematically illustrating a registered vehicle database. The registered vehicle database includes the registered vehicle ID, the vehicle number (the number on the license plate attached to a vehicle), the registrant, the communication ID, the registrant contact address and the like. The registered vehicle database may further include information such as vehicle type (sedan, SUV or the like) and vehicle color.

In the delivery system 1 of the present embodiment, the vehicle 2 that may be designated as a destination is registered in advance. The user may register a vehicle as a destination on the homepage or the like of a delivery company by using the user terminal 6 or the like.

FIG. 7 is a diagram schematically illustrating a deliverer database. The deliverer database includes the deliverer ID, the deliverer mobile phone number, the position information, and the deliverer name.

When each of the deliverer terminals 3 and 4 is provided with a call function, the calling number of each of the deliverer terminals 3 and 4 is stored in the deliverer mobile phone number.

The position information of each deliverer terminal is updated on the basis of information sent regularly or intermittently from each of the deliverer terminals 3 and 4.

FIG. 8 is a diagram schematically illustrating a QR code database. In the example illustrated in FIG. 8, the QR code database includes the delivery server address, the delivery item ID, the recipient, the destination, and the delivery vehicle ID.

How a delivery item W is delivered in the delivery system 1 configured as described above will be described. FIG. 9 is a state diagram illustrating a state where the deliverer 9A delivers the delivery item W. The state illustrated in FIG. 9 is a state before the deliverer delivers the delivery item W, such as a state where the delivery item W has been loaded on the delivery truck 14A or the like.

When a registered vehicle is designated as the destination, the deliverer 9A uses the deliverer terminal 3 to send a first request signal requesting the position information of the registered vehicle to the delivery server 5 (step 10). The first request signal includes the registered vehicle ID and the delivery item ID.

The delivery server 5 obtains the communication ID of the registered vehicle based on the registered vehicle database and the registered vehicle ID included in the first request signal. Then, the delivery server 5 creates a QR code for each registered vehicle, and sends a second request signal to each registered vehicle by using the communication ID (step 11). The second request signal includes the first request signal requesting the position information of the registered vehicle and the QR code. The QR code includes information illustrated in FIG. 8.

Upon receiving the second request signal from the delivery server 5, the vehicle 2 obtains current position information from the position information acquisition device 17. Then, the vehicle 2 sends the position information to the delivery server 5 (step 12). In addition, the vehicle 2 obtains various information illustrated in FIG. 8 from the received QR code.

Upon receiving the position information from the vehicle 2, the delivery server 5 sends to the deliverer terminal 3 the position information of each vehicle and the QR code in association with each registered vehicle ID (step 13).

Thus, when the registered vehicle ID is designated as the destination, the deliverer terminal 3 may obtain the position information of the vehicle.

When arriving at the vehicle 2 designated as the destination, the deliverer 9A holds the deliverer terminal 3 over the reader 20 of the vehicle 2. Specifically, while the obtained QR code is being displayed on the display 32 which is a liquid crystal screen, the deliverer terminal 3 is held over the reader 20 which is a camera. The reader 20 reads the QR code displayed on the deliverer terminal 3. The processor 10 of the vehicle 2 compares the contents of the QR code read by the reader 20 with the contents of the QR code obtained in the above step 11.

Then, when the contents of each QR code match each other, the processor 10 unlocks the locking device 16 illustrated in FIG. 2 (step 14). Thereby, the deliverer 9A may place the delivery item W in the cooling box 12. Specifically, the deliverer 9A opens the door 22 so as to place the delivery item W in the accommodation compartment of the main body 21.

Figure 10:
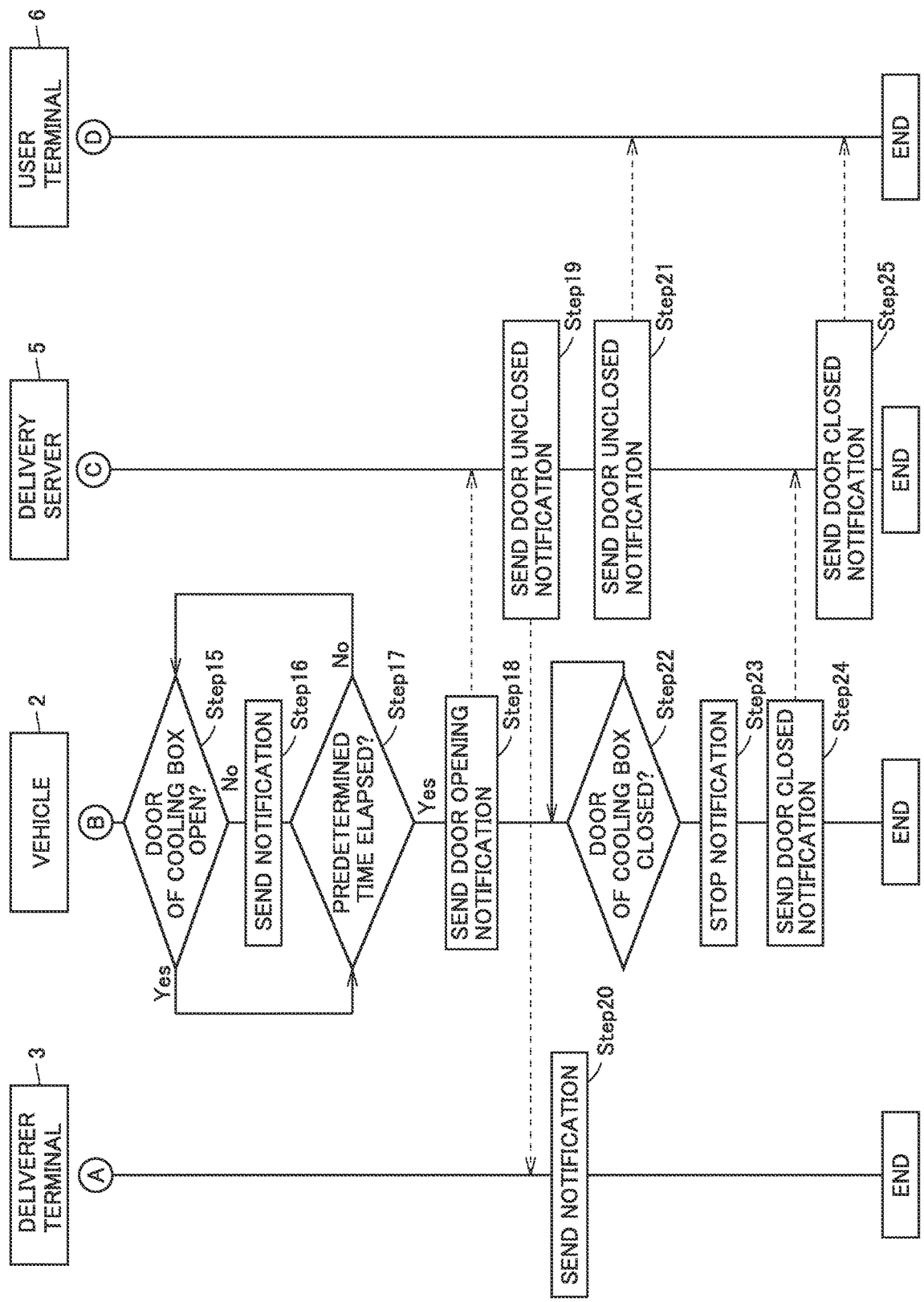
FIG. 10 is a state diagram illustrating a state after a locking device 16 is unlocked.

FIG. 10 is a state diagram illustrating a state after the locking device 16 is unlocked. The processor 10 of the vehicle 2 determines whether or not the door 22 of the cooling box 12 is left open based on the information from the door sensor 24 (step 15).

When it is determined that the door 22 is left open (Yes at step 15), the processor 10 actuates the notification device 18 to notify the surroundings that the door 22 is left open (step 16). If the notification device 18 is a display device, it displays a message indicating that the door 22 is left open. If the notification device 18 is provided with a sound function, the notification device 18 notifies the surroundings that the door 22 is left open by sound.

The processor 10 of the vehicle 2 determines whether or not the door 22 has been left open for a predetermined time (step 17).

After the authentication is performed on the basis of the QR code, the door 22 of the cooling box 12 may be opened by the deliverer 9A. However, if the door 22 is left open for 10 minutes or more, for example, it is considerable that the deliverer 9A may forget to close the door 22. Therefore, if it is determined that the door 22 has been left open for a predetermined time (Yes at step 17), the processor 10 sends a door opening notification to the delivery server 5 (step 18). Specifically, the door opening notification includes the registered vehicle ID of the vehicle and the delivery item ID. The processor 40 of the delivery server 5 obtains the deliverer terminal ID from the delivery item database.

Thereafter, the delivery server 5 sends a door unclosed notification to the deliverer terminal 3 identified from the deliverer ID (step 19). Upon receiving the door unclosed notification, the deliverer terminal 3 actuates the display 32 to send the deliverer 9A a notification indicating that the door is not closed (step 20). If the display 32 is a liquid crystal display device or the like, it displays a message indicating that the door is not closed. If the display 32 is provided with a sound function, the deliverer 9A is notified that the door is not closed by sound.

After being notified that the door is not closed, the deliverer 9A may go to close the door 22.

Upon receiving the door opening notification from the vehicle 2, the delivery server 5 obtains the mail address for the user terminal 6 of the recipient (the user 8) from the delivery item database. Then, a message indicating that the door is unclosed is sent to the user terminal 6 by e-mail (step 21).

After knowing from the mail that the door 22 is left open, if the user 8 is near the vehicle 2, for example, the user 8 may close the door 22 in person.

After sending the door opening notification (step 18), the processor 10 of the vehicle 2 determines whether or not the door 22 is closed based on a signal from the door sensor 24 (step 22).

If it is determined that the door 22 is closed, the processor 10 stops the notification by the notification device 18 (step 23), and sends a door closed notification to the delivery server 5 (step 24). It should be noted that the door closed notification includes the vehicle ID of the vehicle 2.

Upon receiving the door closed notification, the delivery server 5 sends to the user terminal 6 of the user 8 an e-mail notifying that the door 22 has been closed (step 25).

According to the present embodiment as described above, even if the deliverer 9A forgets to close the door 22, by sending a notification indicating that the door is unclosed to the deliverer 9A, it is possible to notify the deliverer 9A to close the door 22.

In the delivery system 1 according to the first embodiment, the deliverer 9A who forgets to close the door 22 is notified to close the door 22, it is acceptable that a deliverer other than the deliverer 9A is notified to close the door 22.

Second Embodiment

A delivery system 1 according to a second embodiment is configured to notify any other deliverer who is relatively closer to the vehicle 2 to close the door 22 if a deliverer forgets to close the door 22 after placing a delivery item W in the cooling box.

Hereinafter, the delivery system according to the second embodiment will be described with reference to FIG. 11 and the like. Note that the delivery system according to the present embodiment is substantially the same as the delivery system according to the first embodiment.

Figure 11:
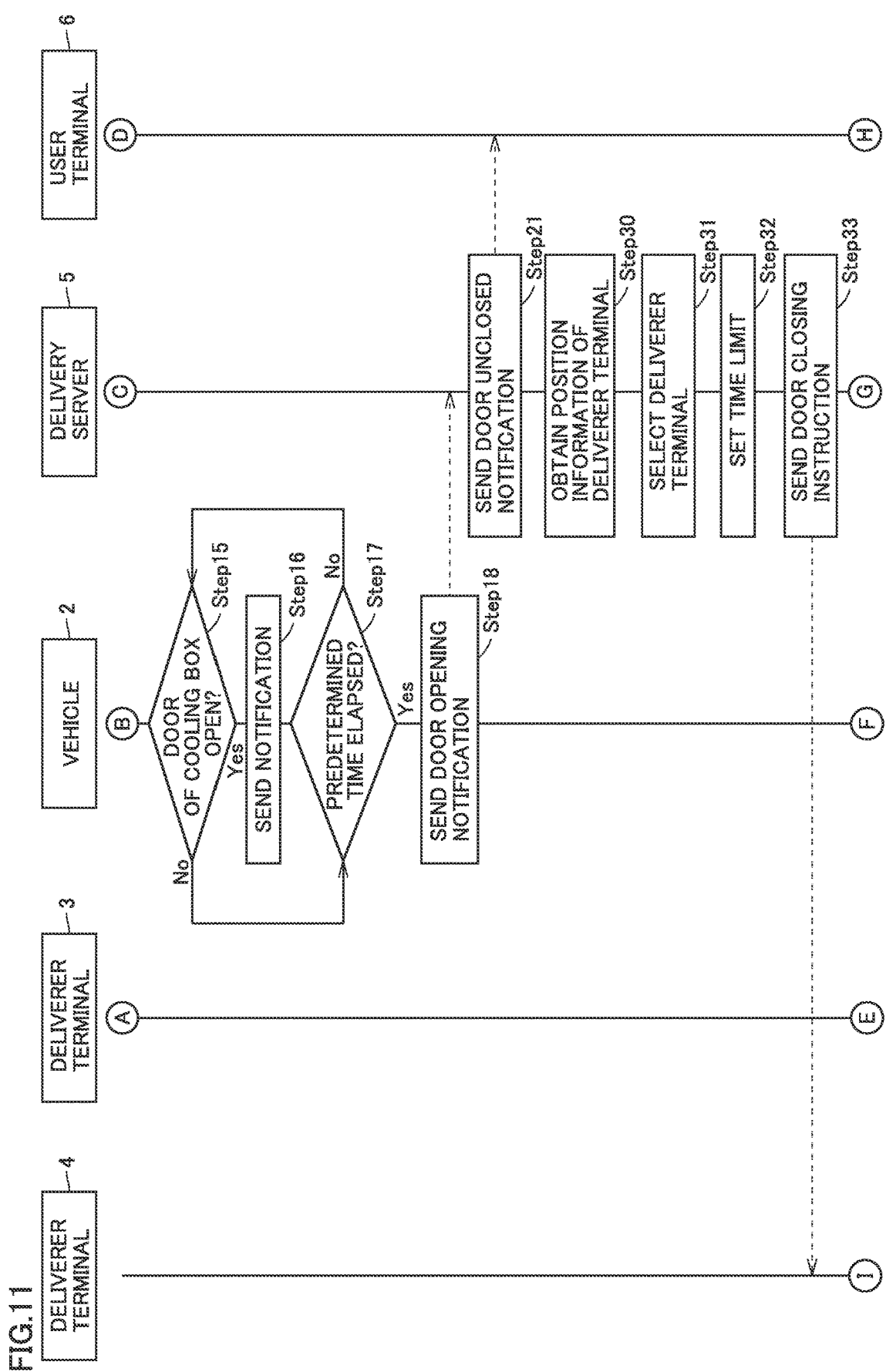
FIG. 11 is a state diagram of a delivery system 1 according to a second embodiment.
Figure 12:
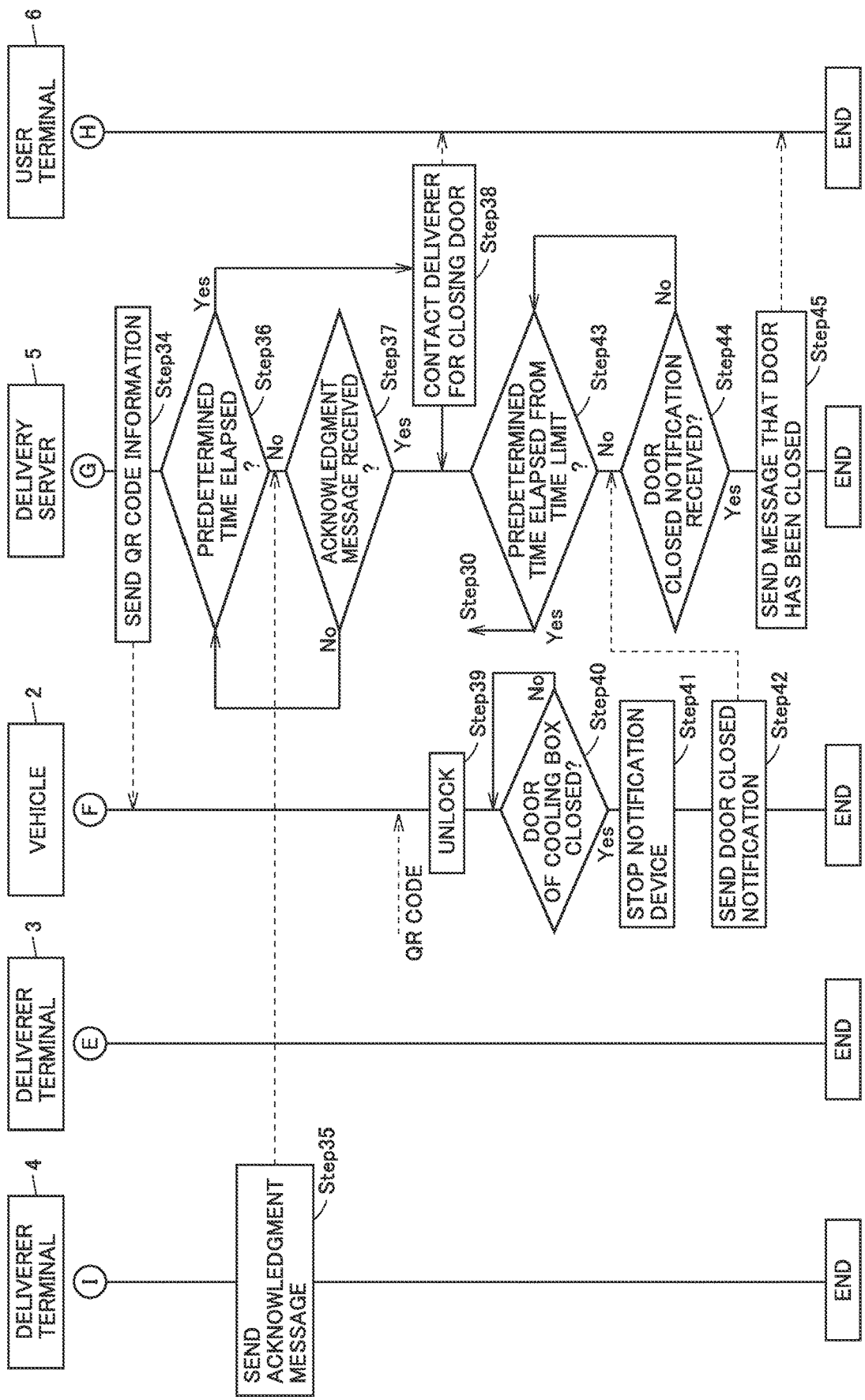
FIG. 12 is a state diagram of the delivery system 1 according to the second embodiment.

FIG. 11 and FIG. 12 are state diagrams of the delivery system 1 according to the second embodiment. Steps 15 to 25 in the state diagram illustrated in FIG. 11 are the same as steps 15 to 25 illustrated in FIG. 10. In the delivery system 1 according to the second embodiment, steps 30 to 45 illustrated in FIG. 12 are additional steps. Therefore, the description will be carried out only on steps 30 to step 45 hereinafter.

Upon receiving a door opening notification from the vehicle 2 (step 18), the delivery server 5 sends to the user terminal 6 of the user 8 an e-mail notifying that the door 22 is not closed (step 21).

The processor 40 of the delivery server 5 obtains the position information of each of the deliverer terminals 3 and 4 from the deliverer database stored in the storage 41 (step 30).

The processor 40 selects the deliverer terminal of a deliverer who can reach the vehicle 2 in the shortest time based on the obtained position information of each of the deliverer terminals 3 and 4 and the map information stored in the storage 41 (step 31). In the example illustrated in FIG. 11, it is assumed that the deliverer 9B who is carrying the deliverer terminal 4 needs shorter time to reach the vehicle 2 the deliverer 9A who is carrying the deliverer terminal 3.

In order to select a deliverer terminal, it is acceptable to calculate the time required by the deliverer 9A who is carrying the deliverer terminal 3 and the time required by the deliverer 9B who is carrying the deliverer terminal 4 to reach the vehicle 2 based on traffic congestion information or the like.

As illustrated in step 17, a predetermined time may have elapsed from the time when the door 22 of the cooling box 12 is left open to the time when the delivery server 5 receives the door opening notification. Therefore, the deliverer 9A who has forgotten to close the door 22 may have been far away from the vehicle 2. Thus, if the other deliverer 9B is in the vicinity of the vehicle 2, it is efficient to notify the deliverer 9B to close the door 22. Therefore, according to the delivery system 1 of the second embodiment, if the deliverer 9B in the vicinity of the vehicle 2 with the door 22 left open, the deliverer 9B may be notified to close the door 22.

The delivery server 5 sets a time limit as a deadline for the deliverer 9B who is carrying the deliverer terminal 4 to close the door 22 (step 32).

The processor 10 of the delivery server 5 sets the time limit for the deliverer 9B to close the door 22 based on the current time, the time required by the deliverer 9B who is carrying the deliverer terminal 4 to reach the vehicle 2 and a margin time.

The delivery server 5 sends a door closing instruction to the deliverer terminal 4 (step 33). The door closing instruction (the door unclosed notification) includes the position information of the vehicle 2, the information of the vehicle 2 stored in the registered vehicle database, the phone number of the user terminal 6 of the user 8, the time limit, and a QR code.

The information stored in the registered vehicle database includes the vehicle number, the vehicle type, the vehicle color and the like of the vehicle 2, which makes it easy for the deliverer 9B to identify the vehicle 2 when he/she arrives at the parking lot where the vehicle 2 is being parked.

Upon receiving the door closing instruction, the processor 30 of the deliverer terminal 4 actuates the display 32 to notify the deliverer 9B that the door closing instruction has been received. As a notifying manner, an image indicating that the door closing instruction has been received may be displayed on the display 32. When the display 32 is provided with a sound function, the deliverer 9B may be notified by sound. The QR code includes the deliverer terminal ID of the deliverer terminal 4 and the like.

When the deliverer 9B receives the door closing instruction, he/she may confirm various information included in the door closing instruction by operating the display 32. After the deliverer 9B has read the door closing instruction, he/she may send an acknowledgment message (response message) to the delivery server 5 from the deliverer terminal 4 (step 35). The acknowledgment message includes the deliverer terminal ID of the deliverer terminal 4.

When foods are accommodated in the cooling box 12, if the door 22 is left open, the foods may be spoilt. Therefore, according to the delivery system 1 of the second embodiment, the deliverer 9B is forced to send an acknowledgment message after reading the door closing instruction. In other words, the deliverer 9B is forced to close the door 22.

After sending the door closing instruction (step 33), the delivery server 5 sends the QR code to the vehicle 2 (step 34). Specifically, the delivery server 5 sends the information included in the QR code which has been sent to the deliverer terminal 4. 93 The delivery server 5 determines whether or not an acknowledgment message has been received within a predetermined time after sending the door closing instruction at step 33 (step 36, step 37).

If the predetermined time has elapsed (Yes at step 36) and yet the acknowledgment message has not been received (No at step 37), the delivery server 5 sends to the user the contact address of the deliverer 9B who is notified to close the door 22 (step 38). Specifically, the delivery server 5 sends to the user the calling number of the deliverer terminal 4 or the phone number of the deliverer 9B.

If the acknowledgment message has not been received after the predetermined time, the deliverer 9B of the deliverer terminal 4 may not be aware of the door closing instruction. Therefore, the user may contact the deliverer 9B so as to remind the deliverer 9B of the door closing instruction. At step 38, the internal temperature of the cooling box 12 may be added to the information to be sent to the user terminal 6 of the user. In this case, the delivery server 5 obtains the internal temperature from the vehicle 2.

When the deliverer 9B holds the display 32, on which a QR code is being displayed, over the reader 20 of the vehicle 2, the reader 20 obtains the QR code displayed on the display 32. The processor 10 reads the contents from the QR code displayed on the display 32 and compares the contents with the those of the obtained QR code, and if the contents of each QR code match each other, the locking device 16 is unlocked (step 39).

Then, the processor 10 determines whether or not the door 22 is closed based on the information from the door sensor 24 (step 40). If it is determined that the door 22 is closed (Yes at step 40), the processor 10 stops the notification device 18 (step 41), and sends a door closed notification to the delivery server 5 (step 42).

After sending to the user terminal 6 the contact information of the deliverer who is notified to close the door (step 38), the processor 40 of the delivery server 5 determines whether or not a door closed notification has been received (step 44). If it is determined that after the predetermined time has elapsed from the time limit (Yes at step 43), and yet the door closed notification has not been received (No at step 44), the process returns to step 30 where the processor 40 selects another deliverer who will be notified to close the door 22. It is considerable that the deliverer 9B who is carrying the deliverer terminal 4 may not be able to close the door 22 for some reasons.

On the other hand, if before the predetermined time has elapsed from the time limit (No at step 43), the door closed notification has been received (No at step 44), the processor 40 sends to the user terminal 6 of the user 8 an e-mail indicating that the door has been closed through the communication device 34 (step 45).

Thus, according to the delivery system 1 of the second embodiment, it is possible to notify the deliverer 9B who is the vicinity of the vehicle 2 to close the door 22 if the door 22 is left open, preventing the foods accommodated in the cooling box 12 from getting spoilt.

Third Embodiment

Figure 13:
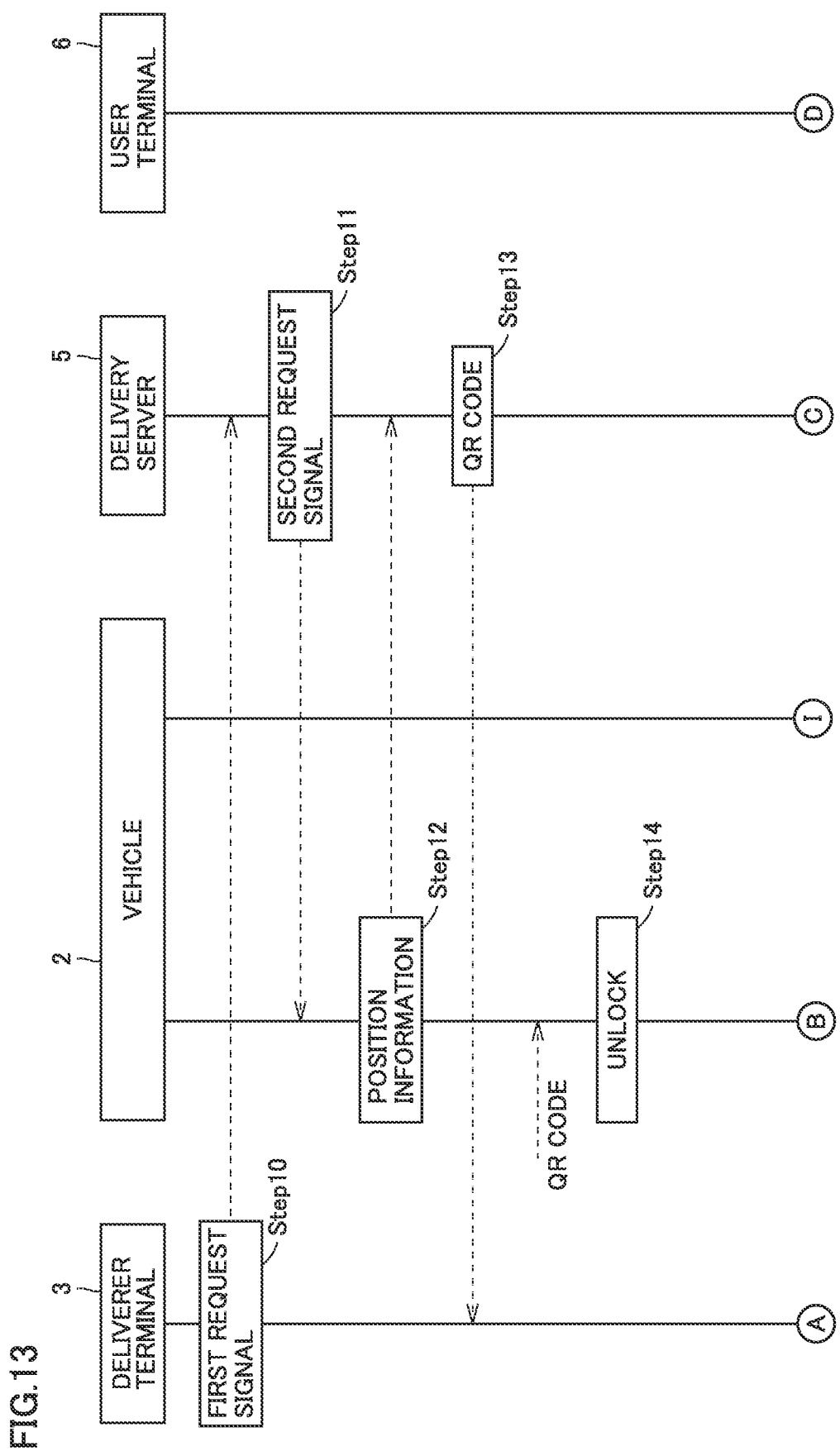
FIG. 13 is a state diagram of a delivery system 1 according to a third embodiment.
Figure 14:
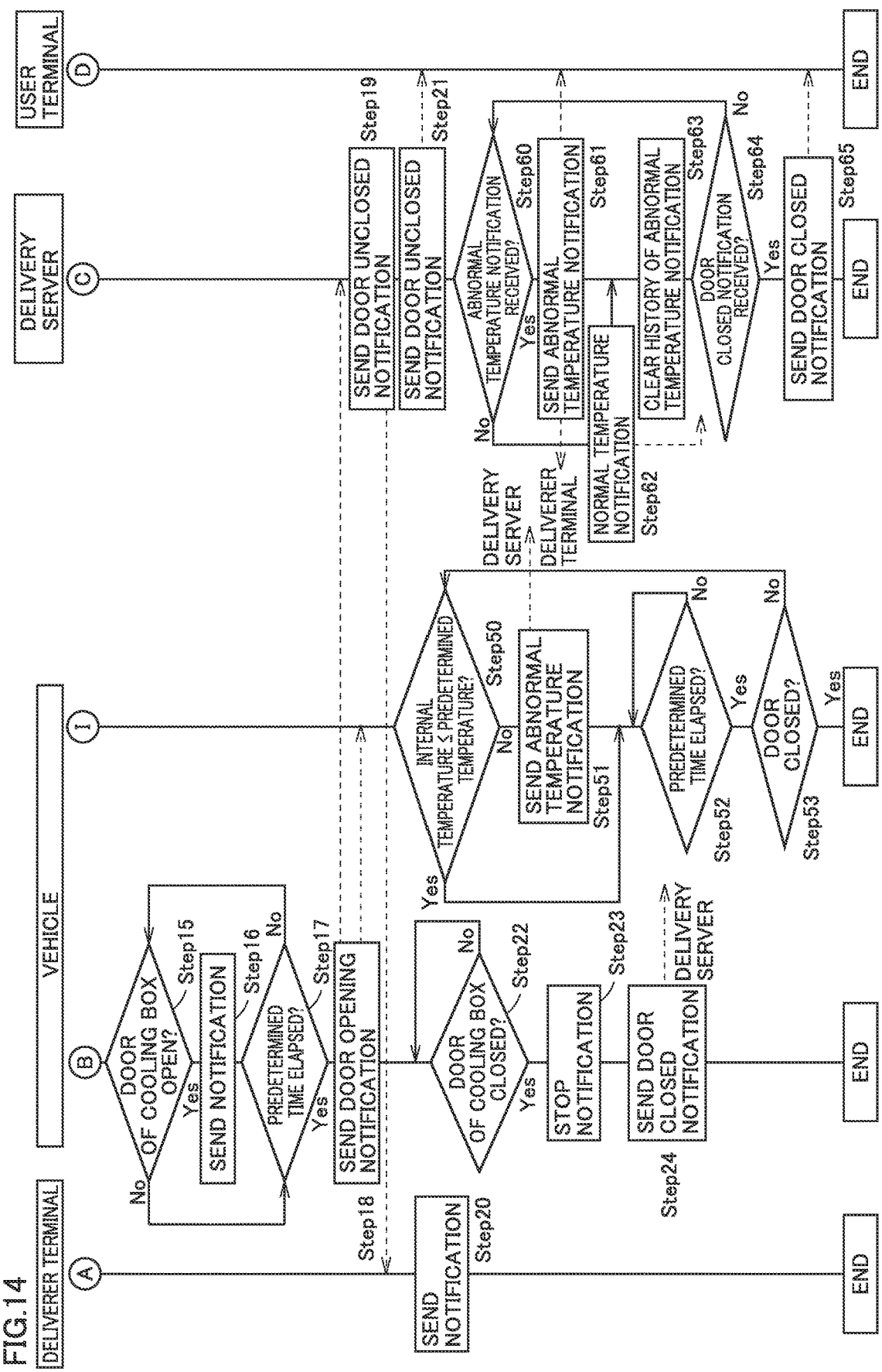
FIG. 14 is a state diagram of the delivery system 1 according to the third embodiment.

A delivery system 1 according to a third embodiment will be described with reference to FIGS. 13 and 14. The delivery system 1 according to the third embodiment is substantially the same as the delivery system according to the first embodiment and the delivery system according to the second embodiment. FIG. 13 and FIG. 14 are state diagrams of the delivery system 1 according to the third embodiment. The processor 10 of the vehicle 2 performs a processing related to the opening and closing of the door and a processing related to the internal temperature in parallel.

Steps 10 to 24 illustrated in FIGS. 13 to 14 are substantially the same as steps 10 to 24 described in the first and second embodiments. Therefore, the description will be carried out only on steps 50 to 65 hereinafter.

As illustrated in FIG. 14, after sending a door opening notification at step 18, the processor 10 determines whether or not the temperature in the cooling box 12 is equal to or lower than a predetermined temperature (step 50). The processor 10 obtains the temperature of the accommodation compartment in the cooling box 12 based on the information from the temperature sensor 23.

If it is determined that the internal temperature (the temperature of the accommodation compartment in the cooling box 12) is higher than the predetermined temperature, the processor 10 sends an abnormal temperature notification to the delivery server 5 (step 51).

After the abnormal temperature notification was sent and a predetermined time has elapsed (Yes at step 52), the processor 10 determines whether or not the door 22 is closed (step 53). If the door 22 of the cooling box 12 is not closed (No at step 53), the process returns to step 50 where the internal temperature and the predetermined temperature are compared.

Thus, by comparing the internal temperature and the predetermined temperature again after a predetermined time has elapsed, it is possible to prevent the abnormal temperature notification from being sent frequently. On the other hand, if it is determined that the door 22 is closed, the process performed by the processor 10 is terminated.

After receiving a door opening notification from the vehicle 2 (step 19) and sending a door unclosed notification (step 21), the processor 40 of the delivery server 5 determines whether an abnormal temperature notification has been received (step 60). If it is determined that the abnormal temperature notification has been received (Yes at step 60), the delivery server 5 sends an abnormal temperature notification to the user terminal 6 of the user 8 and the deliverer terminal 3 (step 61). It is acceptable that the abnormal temperature notification may be sent to at least one of the user terminal 6 and the deliverer terminal 3.

After sending the abnormal temperature notification, the processor 40 clears the history of the abnormal temperature notification (step 63).

Thereafter, the processor 40 determines whether or not a door closed notification has been received from the vehicle 2 (step 64). If it is determined that the door closed notification has been received (Yes at step 65), the delivery server 5 sends the door closed notification to the user terminal 6 (step 65). Then, the process is terminated. On the other hand, if the processor 40 determines that the door closed notification has not been received (No at step 65), the process returns to step 60 where the processor 40 determines whether or not an abnormal temperature notification has been received. In this way, until the door 22 is closed, the temperature sensor 23 keeps detecting the internal temperature of the cooling box and sends the result to the user terminal 6 of the user 8.

According to the present embodiment, if the temperature in the accommodation compartment of the cooling box 12 rises, the user 8 is informed of the internal temperature.

The embodiments and examples disclosed herein are illustrative and non-restrictive in any respect. The technical scope indicated by the claims is intended to include any modifications within the scope and meaning equivalent to the terms of the claims.

What is claimed is:

1. A delivery system for delivering a delivery item to a vehicle comprising:
   the vehicle capable of accommodating the delivery item and connected to the Internet,
   a delivery server connected to the Internet,
   a user terminal, carried by a user, connected to the Internet, and
   a deliverer terminal, carried by a deliverer, connected to the Internet and including a display capable of displaying an image, wherein
   the vehicle includes
      a locking device including a processor for processing and computing information,
      a reader configured to obtain the information from the deliverer terminal and sending the obtained information to the processor of the locking device, and
      a vehicle door provided on the vehicle, wherein the locking device configured to lock the vehicle door based on a signal received from the deliverer terminal,
   the delivery server acquires vehicle information including a vehicle type and a color of the vehicle from the user terminal,
   the deliverer terminal acquires the vehicle information from the delivery server, the deliverer terminal displays the vehicle information on the display,
   the delivery server sends a code in association with the vehicle to the deliverer terminal, and
   the deliverer terminal sends the signal to unlock the vehicle door, for delivering the delivery item to the vehicle by the deliverer, to the processor of the locking device of the vehicle by using the code received from the delivery server.

2. The delivery system according to claim 1, wherein the user terminal receives a completion notification from the delivery server when the door is closed after the door is opened.

3. The delivery system according to claim 1, wherein the delivery server obtains position information of the vehicle from the vehicle, and
the deliverer terminal obtains the position information of the vehicle from the delivery server.

4. The delivery system according to claim 1, wherein the vehicle includes a cooling box, and the cooling box is configured to accommodate the delivery item.

5. The delivery system according to claim 4, wherein the cooling box includes
   a main body having an opening, and
   a door provided so as to open and close the opening of the main body, and
the vehicle sends a door opening notification to the delivery server when the door of the cooling box has been left open for a predetermined time after the deliverer terminal unlocks the locking device, the door opening notification including a vehicle ID of the vehicle and a delivery item ID of the delivery item.

6. The delivery system according to claim 5, wherein the delivery server, upon receiving the door opening notification from the vehicle, sends an e-mail to the user terminal, the e-mail notifying that the door of the cooling box is not closed.

7. The delivery system according to claim 5, wherein the delivery server, upon receiving the door opening notification from the vehicle, sends a door closing instruction to the deliverer terminal,
the deliverer terminal, upon receiving the door closing instruction, actuates the display to notify a deliverer that the door closing instruction has been received, and
the deliverer terminal sends an acknowledgment message to the delivery server when the deliverer has read the door closing instruction, the acknowledgment message including a deliverer terminal ID of the deliverer terminal.

8. The delivery system according to claim 5, wherein the vehicle, after sending the door opening notification to the delivery server, determines whether or not a temperature in the cooling box is equal to or lower than a predetermined temperature,
the vehicle sends an abnormal temperature notification to the delivery server when the vehicle determines that the temperature in the cooling box is higher than the predetermined temperature, and the delivery server, upon receiving the abnormal temperature notification, sends the abnormal temperature notification to at least one of the user terminal and the deliverer terminal.

9. The delivery system according to claim 1, wherein the vehicle further includes a reader configured to obtain information from the deliverer terminal close to the reader, and the locking device of the vehicle is unlocked when the deliverer terminal is held over the reader while the code in association with the vehicle is being displayed on the display.

* * * * *